UNITED STATES PATENT OFFICE.

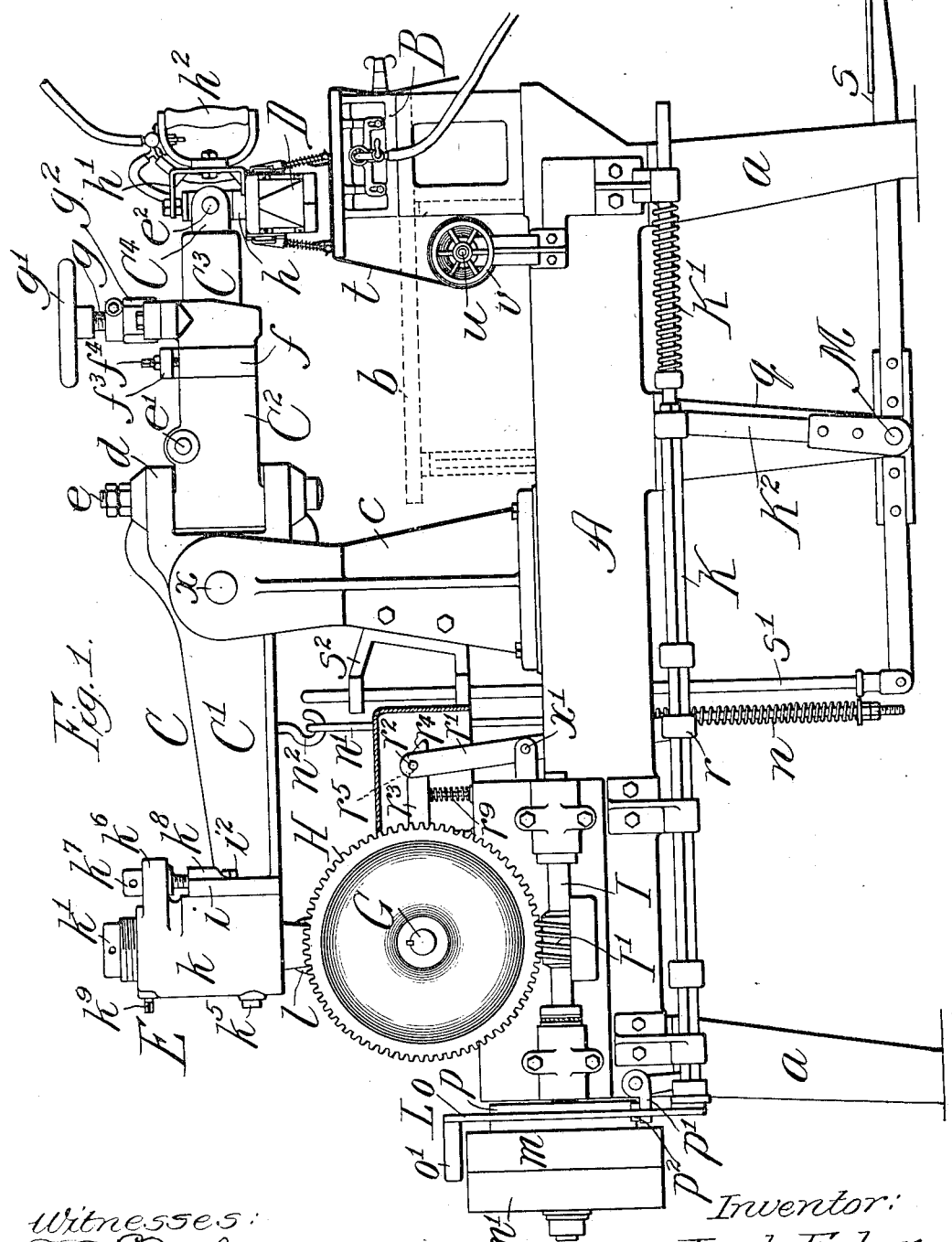

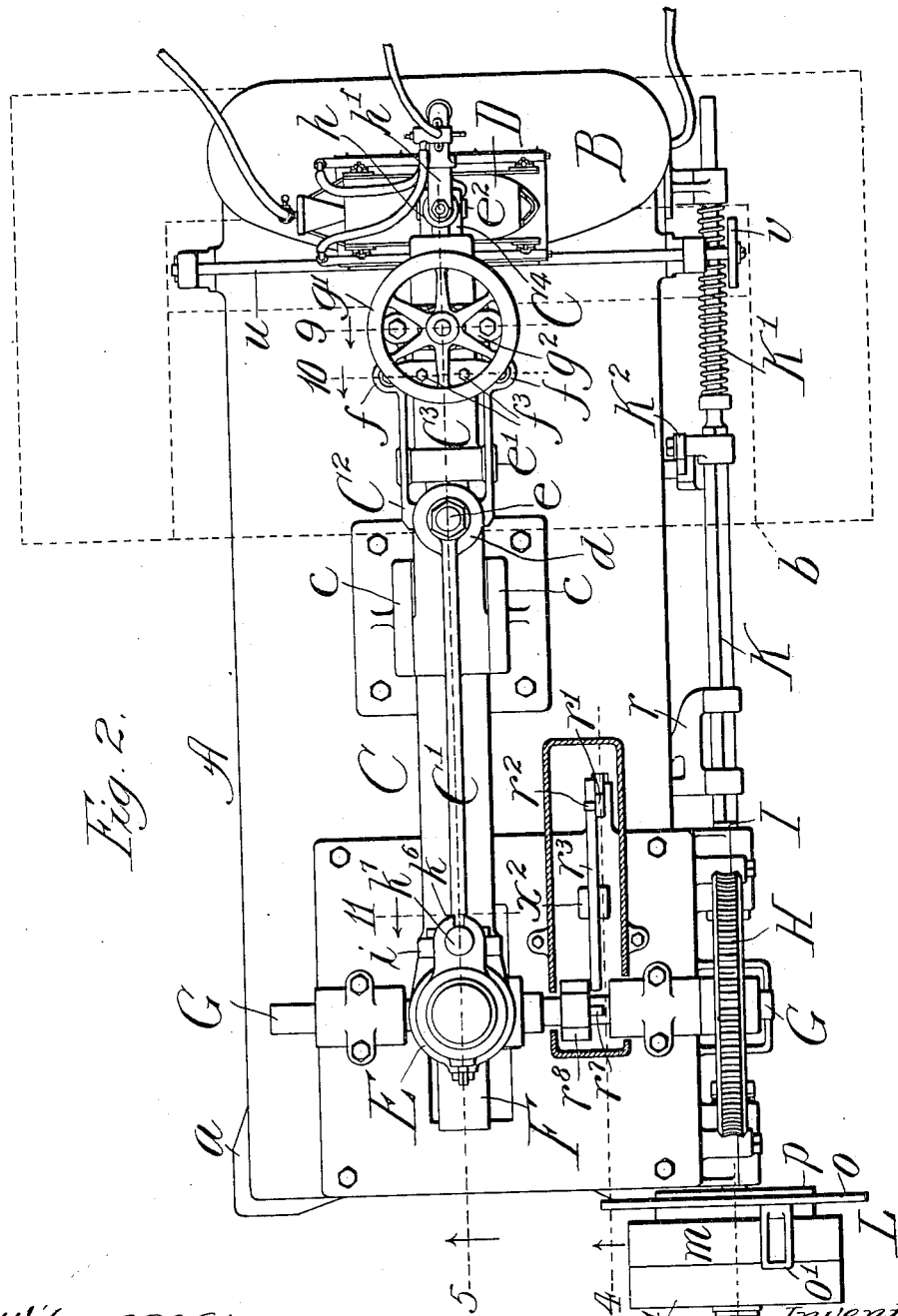

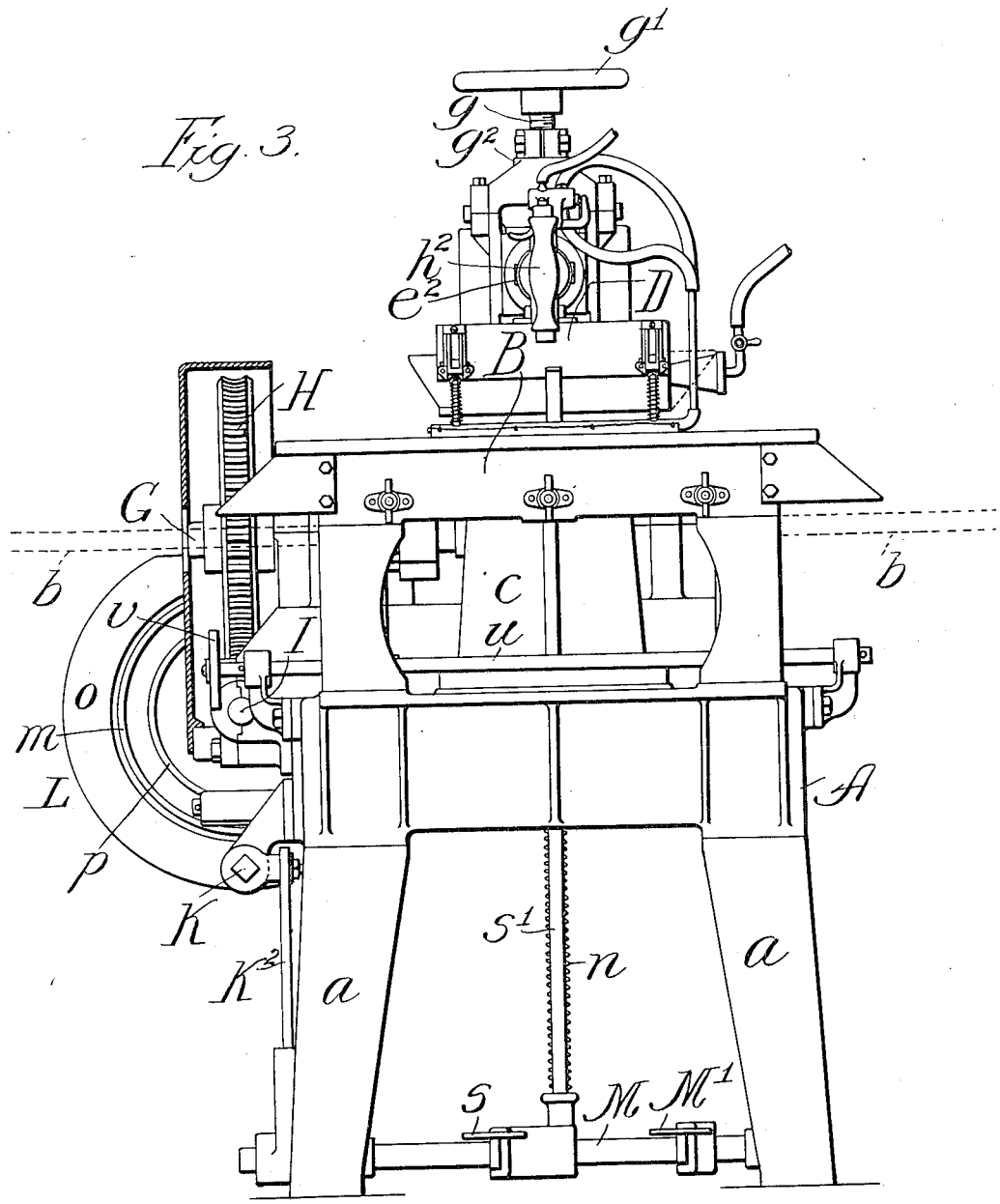

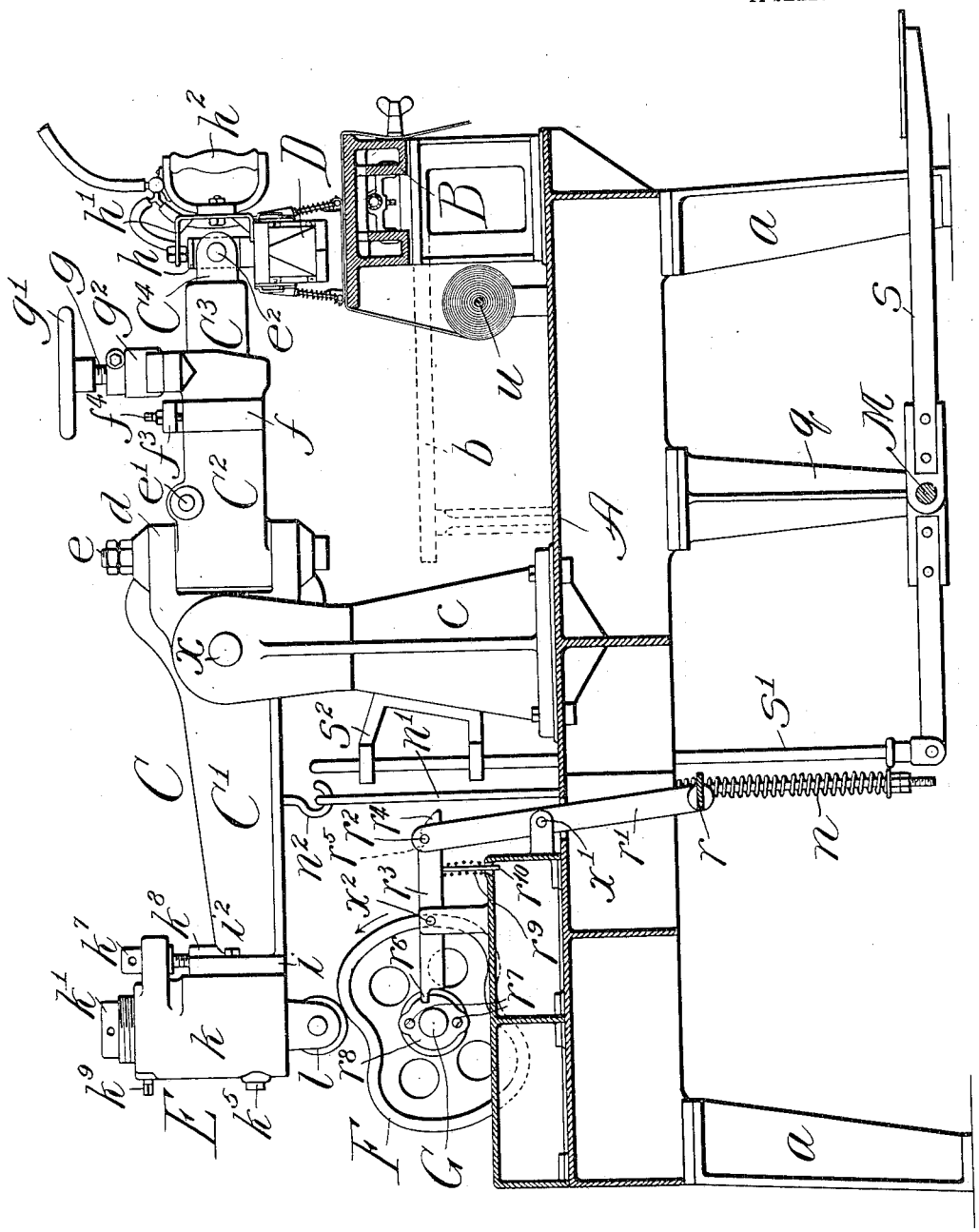

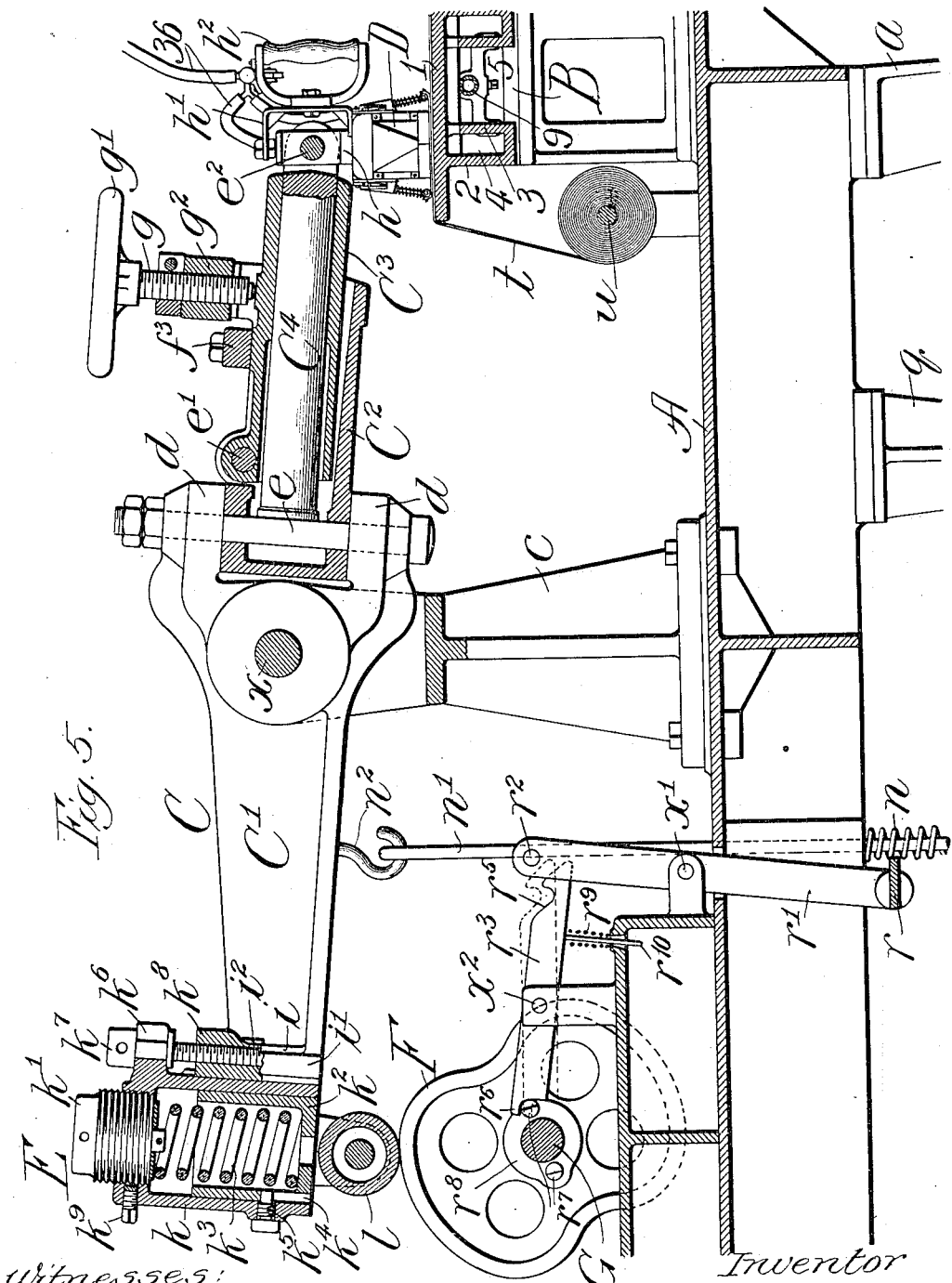

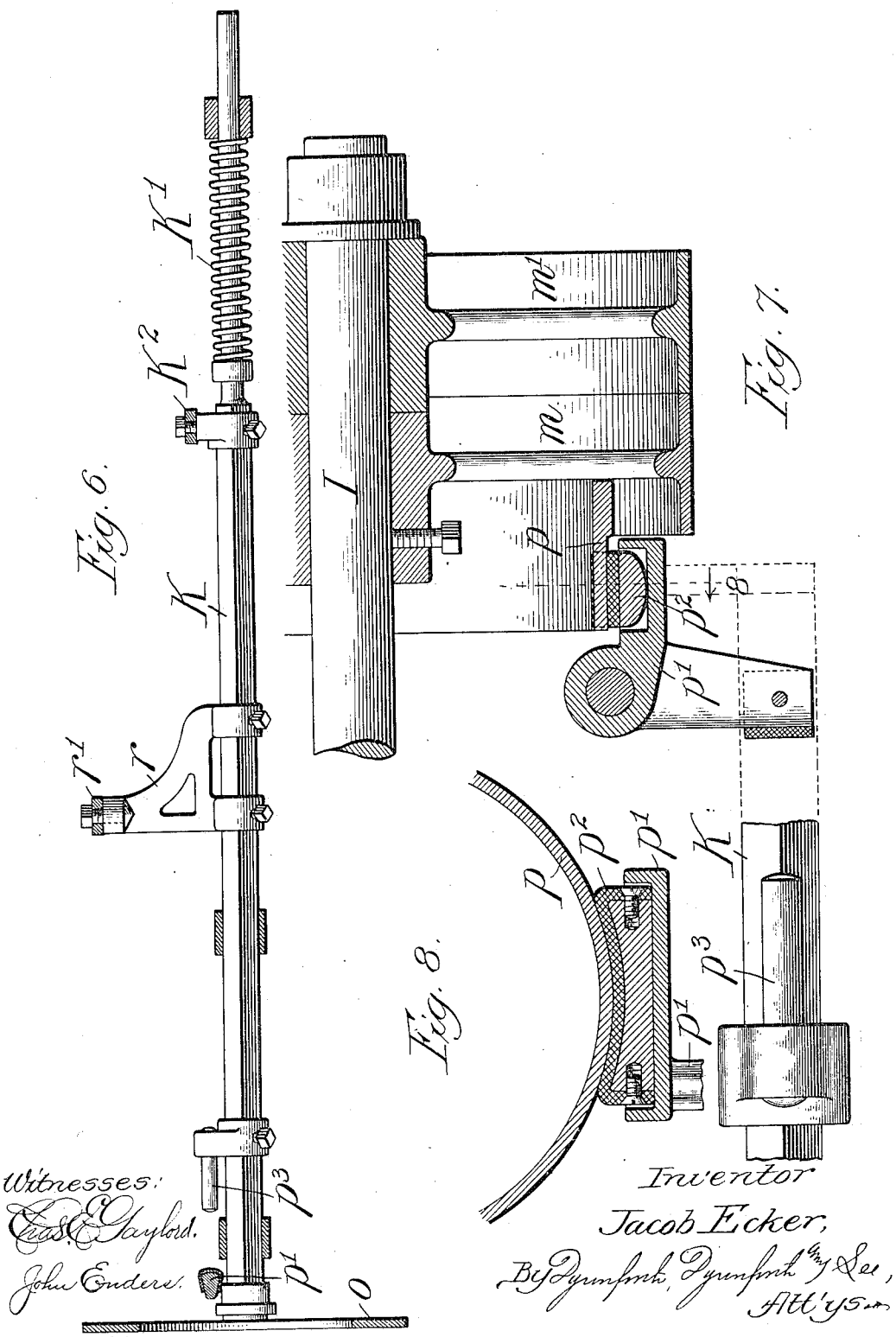

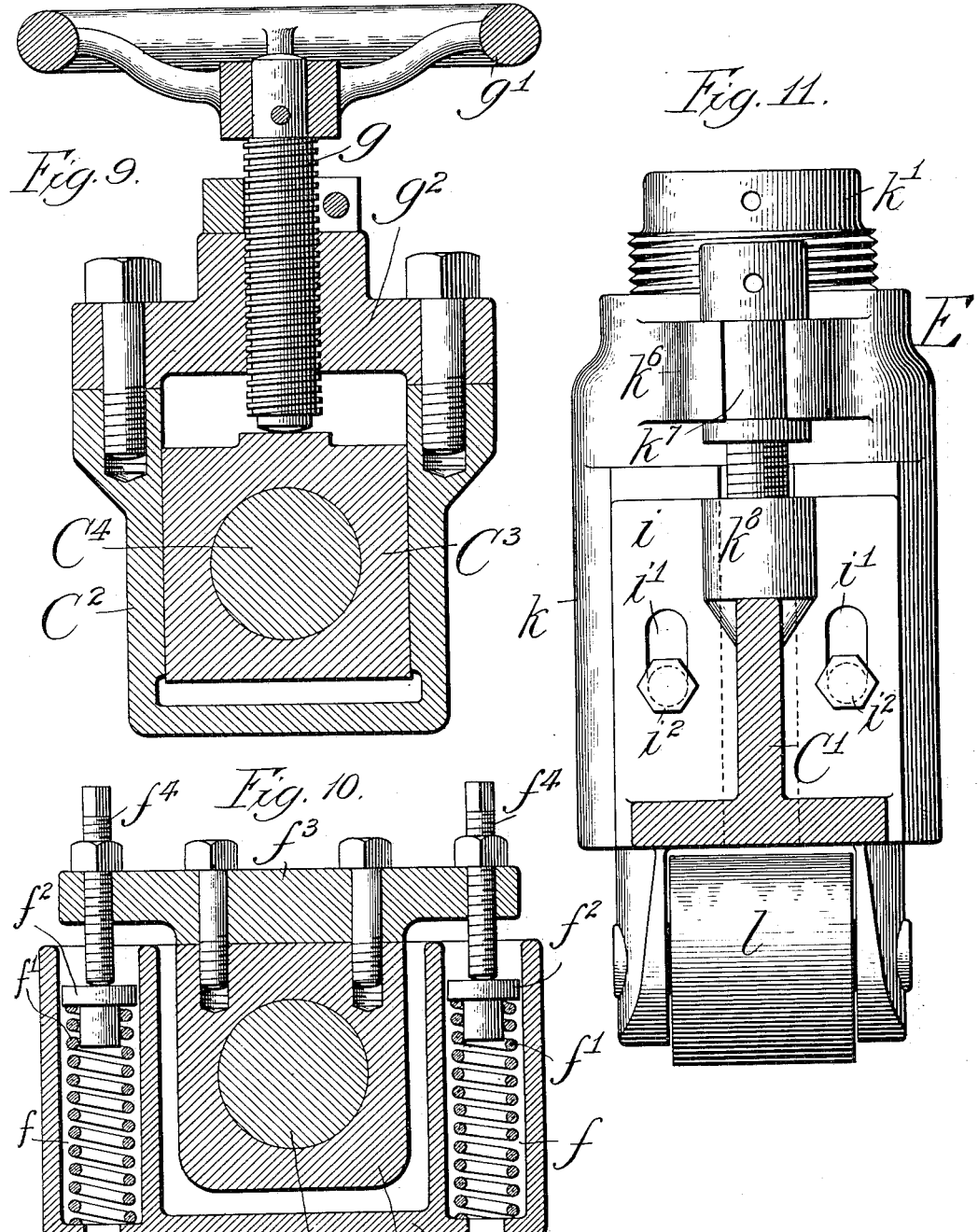

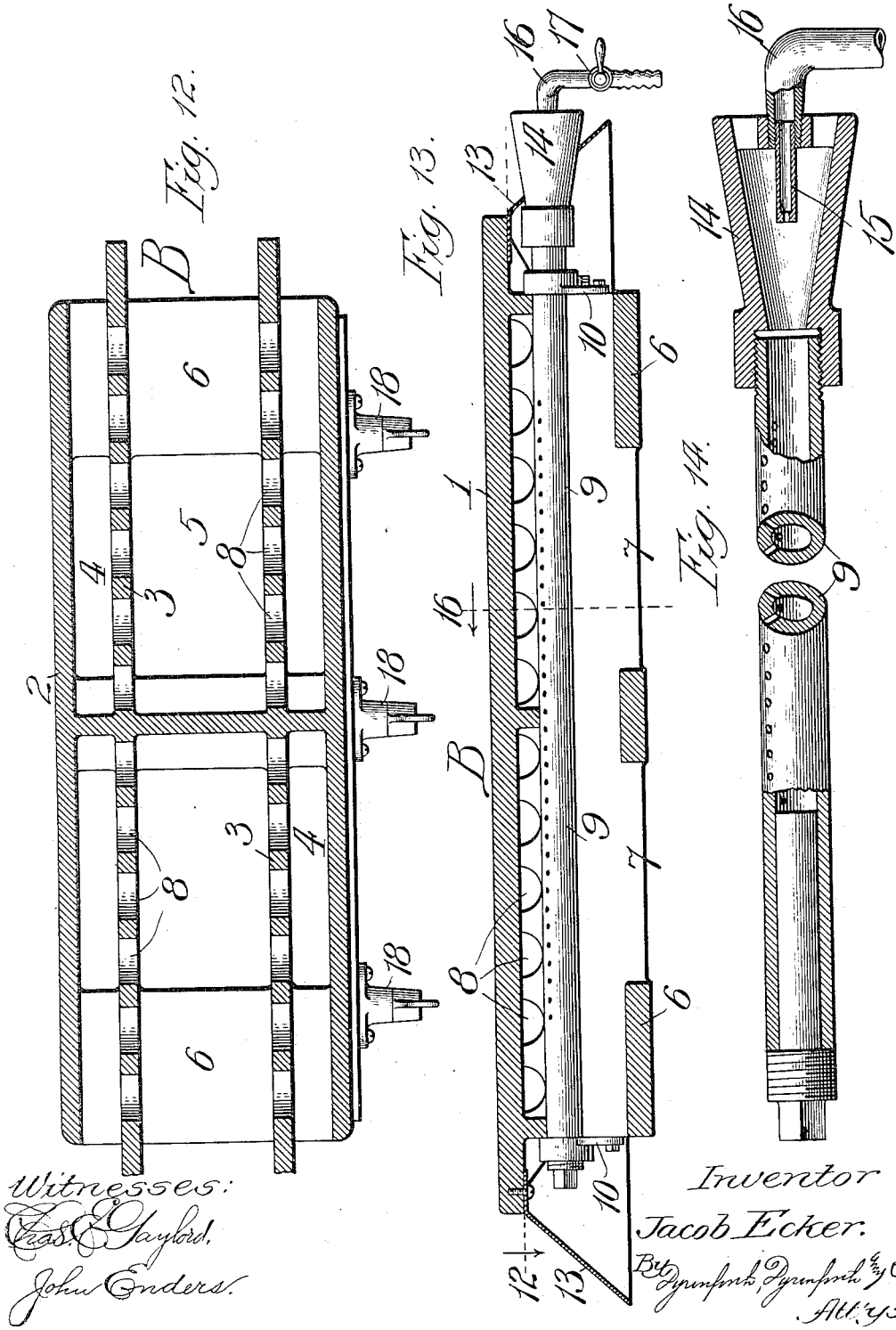

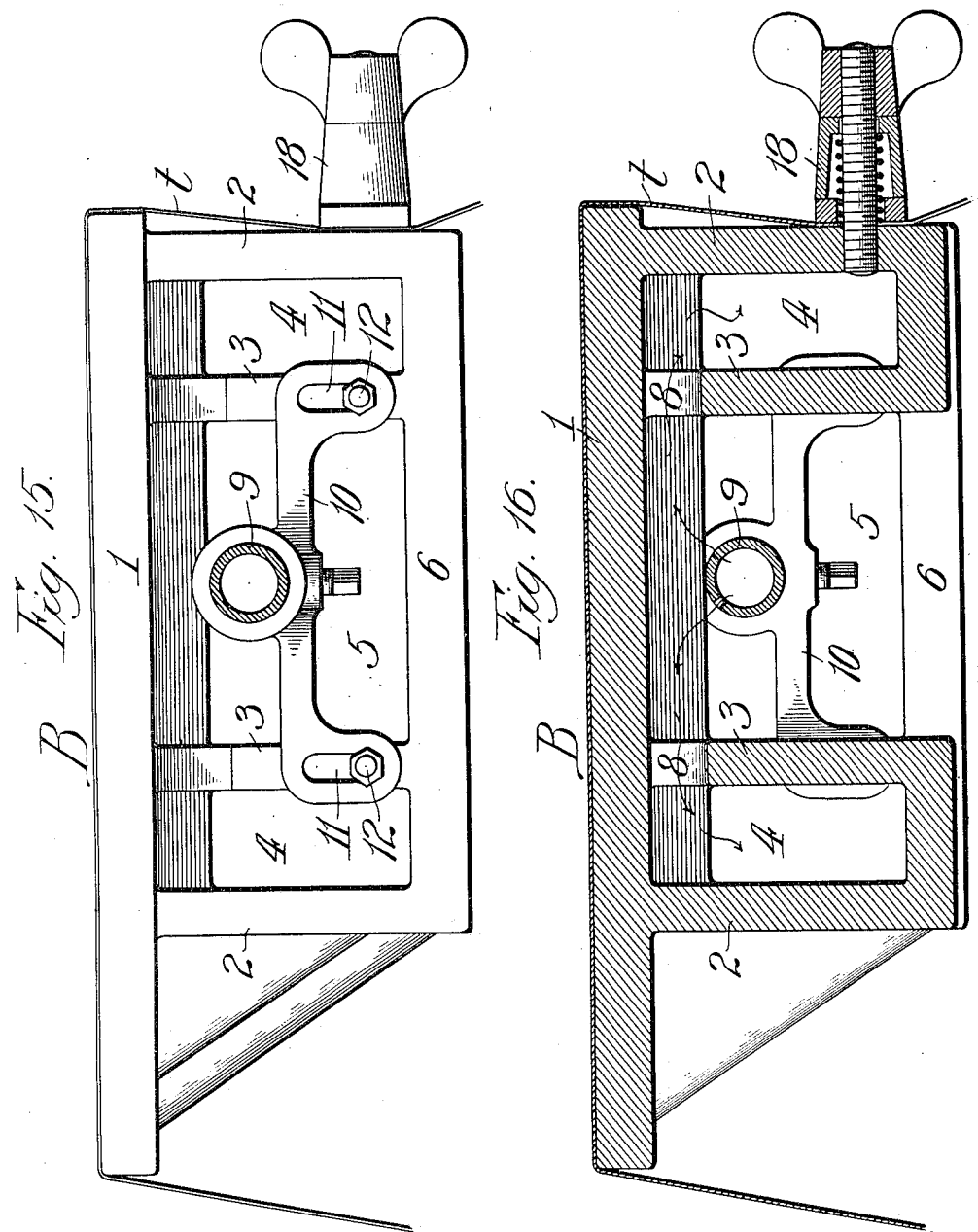

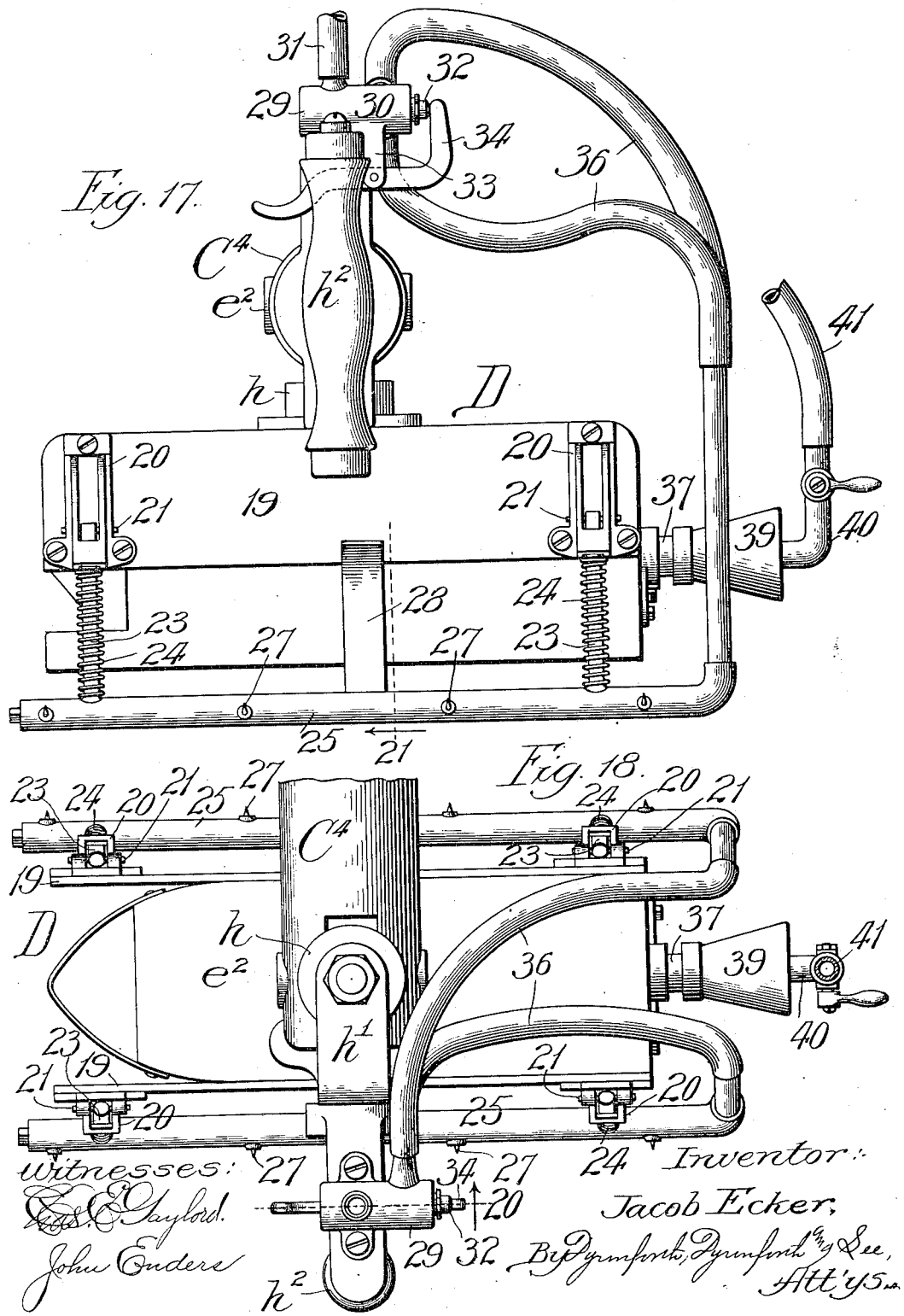

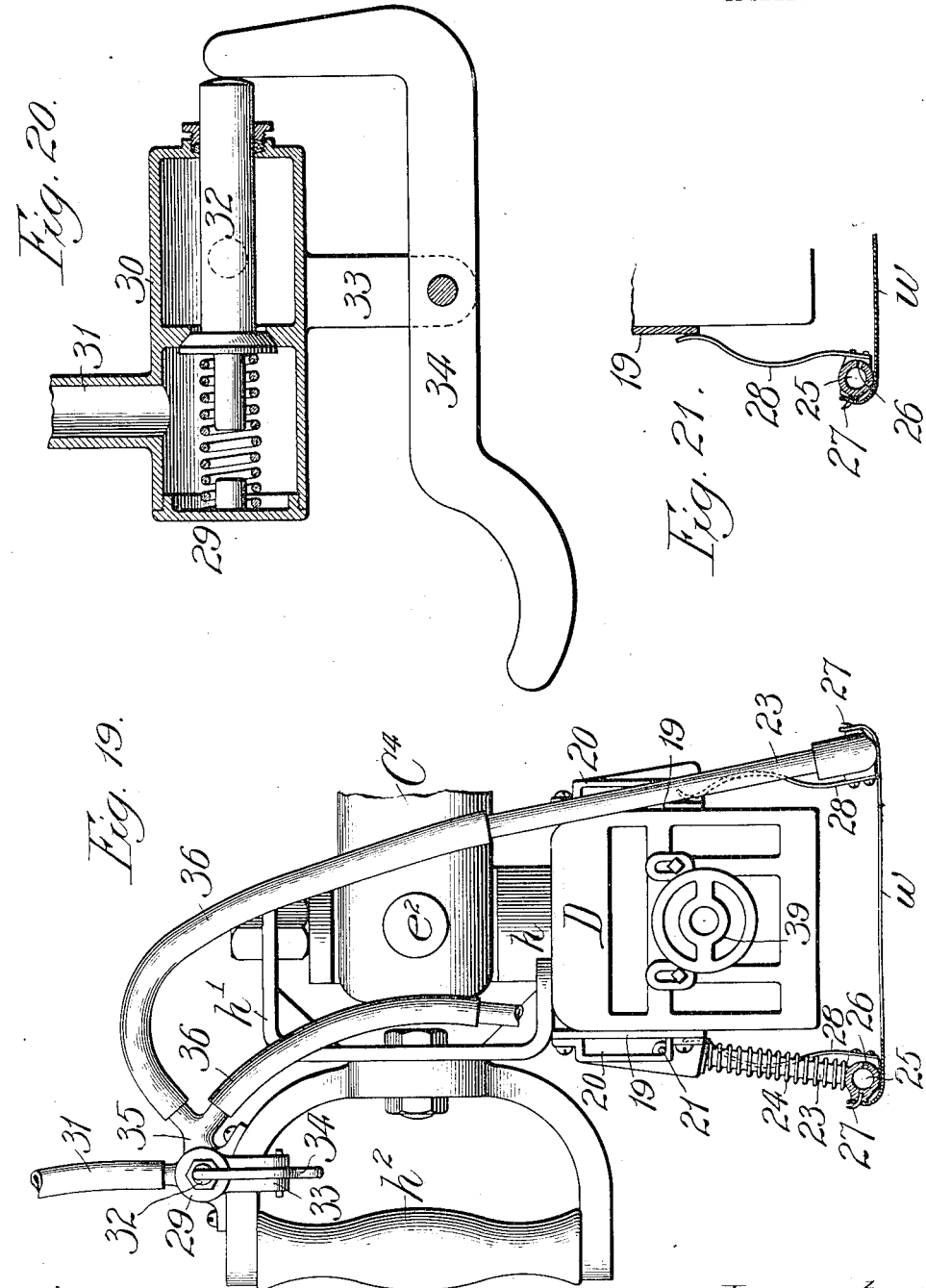

JACOB ECKER, OF CHICAGO, ILLINOIS.

CLOTH-PRESSING MACHINE.

No. 818,753.

Specification of Letters Patent.

Patented April 24, 1906.

Application filed January 25, 1905. Serial No. 242,657.

*To all whom it may concern:*

Be it known that I, JACOB ECKER, a citizen of the United States, residing at Chicago, in the county of Cook and State of Illinois, have invented a new and useful Improvement in Cloth-Pressing Machines, of which the following is a specification.

My invention relates to an improvement in the class of machines employed, as their more common use, by tailors in the process of making garments for pressing the folds, seams, and stitched portions of the latter.

An extensively used type in the class of machines referred to involves a lever fulcrumed at the back of the machine and depressible toward its forward end, which is adjacent to and above the "buck" or board on which the work is supported to be pressed, this lever being jointed to adapt it to be turned toward its forward end laterally for swinging it out of the way and returning it for action, and a sad-iron on the outer end of a plunger telescoping the tubular forward end of said lever, the connection between the plunger and said sad-iron rendering the latter freely movable in various directions under manipulation by the operator, who employs the weight of his body to exert the required yielding pressure of the sad-iron on the work by standing upright on the free forward end of a spring-controlled treadle connected at its opposite end with the pressing-lever and exerting his body to teeter the treadle, like a spring-board, with a rapid motion to vibrate the free end of the lever, and with it the sadiron, against the work upon which it is imposed.

My invention is designed to afford an improvement more particularly on the type of machine of the construction thus generally described for accomplishing certain objects, the more important of which is to render the machine operative by mechanical power, in contradistinction to man - power, without, however, necessarily excluding the last-named manner of operation, thereby to afford a practically automatic machine, with the advantages of very materially increased efficiency, facility, and expedition of operation.

In pressing a garment with a heated sadiron, as in the old machine referred to, it is customary to apply preparatorily the necessary moisture by sponging a layer of thin cloth imposed upon the upper surface of the garment to be pressed, and the moisture penetrates to the lower surface of the work, leaving the under surface moist. It is desirable to render the garment where it is subjected to the pressure uniformly smooth on both surfaces, and to that end and to the end of preventing the work of pressing from being otherwise imperfect the garment should be uniformly dried throughout. I therefore equip my improved machine with a chambered metal buck provided with means for heating it, thus to enable the work to be pressed between heated surfaces, with the effect of drying it thoroughly and rendering the result of pressing uniform on both of its surfaces.

Referring to the accompanying drawings, Figure 1 shows the improved machine by a view in side elevation. Fig. 2 is a plan view of the same. Fig. 3 is a front end view. Fig. 4 is a section taken at the line 4 on Fig. 2 and viewed in the direction of the arrow. Fig. 5 is a section taken at the line 5 on Fig. 2 and viewed in the direction of the arrow. Fig. 6 is a view showing in plan the shifting-rod device for controlling the starting and stopping of the machine. Fig. 7 is a section taken at the line 7 on Fig. 2 viewed in the direction of the arrow and enlarged. Fig. 8 is a section taken at the line 8 on Fig. 7 and viewed in the direction of the arrow. Figs. 9, 10, and 11 are sections taken, respectively, at the lines 9, 10, and 11 on Fig. 2 viewed in the direction of the arrows and enlarged, showing three different means for adjustment on the pivotal pressure-beam. Fig. 12 is a section taken at the line 12 on Fig. 13 and viewed in the direction of the arrow. Fig. 13 is an enlarged longitudinal vertical central section through the buck in its preferred construction for use in the machine. Fig. 14 shows by a broken and partly sectional and enlarged view the gas-feeding tube of the buck. Fig. 15 shows the buck by a view presenting the gas-fed end in elevation. Fig. 16 is a section taken at the line 16 on Fig. 13 viewed in the direction of the arrow and enlarged. Fig. 17 shows the sad-iron by a view in front elevation involving the preferred construction for use in the machine. Fig. 18 shows the same by a plan view, and Fig. 19 shows the same by a view in end elevation presenting the gas-fed end. Fig. 20 is a section taken at the line 20 on Fig. 18 viewed in the direction of the arrow and enlarged, and Fig. 21 a broken section taken at the line 21 on Fig. 17 and viewed in the direction of the arrow.

A is the bed, shown to be supported on legs $a\ a$ and to be equipped with a buck B, or pressing-bed, represented as a permanent attachment surmounting the bed on standards at the forward or operating end of the machine and involving the preferred construction, hereinafter described, forming the subject of my application for Letters Patent, Serial No. 242,658, filed concurrently herewith on the 25th day of January, 1905. Adjacent to the buck a table may, as indicated at $b$, be provided on the bed, on which to lay the work, while the part thereof to be pressed is spread upon the upper surface of the buck; but this is not an essential feature; nor is the particular kind or construction of buck illustrated an essential part of the machine, for the buck ordinarily used on pressing-machines of the type referred to or any suitable kind of buck may be employed.

A standard $c$, bifurcated at its upper end, rises from the machine-bed near its center and has fulcrumed in the end at $x$ a presser-beam C between its ends. This beam constitutes an important feature of the improved machine and it involves the following-described construction, which is best shown in Fig. 5.

The beam C is formed of a rear section C′, shown solid, through the forward expanded end of which it is fulcrumed on the supporting-standard $c$ to rock vertically, this expanded end terminating in a jaw $d$ to receive the rear enlarged end of a housing-section $C^2$, which is pivotally fastened in the jaw by a vertical pin $e$ to permit the section $C^2$ to be swung laterally. The section $C^2$ embraces an open-ended tubular section $C^3$, fulcrumed at its inner end by a horizontal pin $e'$ on the section $C^2$ and having a plunger $C^4$, forming the forward section of the beam, confined in it to be rotatable and longitudinally reciprocable. The section $C^3$, which is open along its upper side, (see Fig. 10,) is formed near its forward end with side chambers $f f$, confining in them vertically-coiled springs $f'$, carrying bearing-heads $f^2$, and bolted on the section $C^3$ to extend across it is a bar $f^3$, extending over the upper ends of the chambers $f$ and carrying coincident therewith set-screws $f^4$ to engage the heads $f^2$ for a purpose hereinafter explained. The tubular section $C^3$ is resiliently supported forward of its pivot $e'$ by the set-screws $f^4$, bearing against the springs $f'$, which tend to raise the beam-section $C^3$ at its outer end, the tension of the supporting-springs being adjustable through the medium of the set-screws, and this raising tendency is opposed by a set-screw $g$, provided with a hand-wheel $g'$ and working against the top of the beam-section $C^3$ through a cross-head $g^2$, bolted to the sides of the section $C^2$, Fig. 9. The forward end of the plunger is thus adjacent to the buck B and carries the sad-iron D, involving a construction generally like that of the buck and forming the subject of my application for Letters Patent, Serial No. 242,659, filed concurrently herewith on the 25th day of January, 1905. Any suitable sad-iron may, however, be used with my improved machine when adapted to be pivotally connected with the outer end of the plunger $C^4$ in a manner to permit of its manipulation in the various directions required in its use. Thus the iron D has a stem $h$ extending vertically from its upper side through the outer end of the plunger, wherein it is supported pivotally on a horizontal pin $e^2$ to enable it to be turned accordingly. A bracket $h'$ is rigidly secured to the iron and stem to extend toward the front side of the iron and carries rigidly the operating-handle $h^2$. Thus supported, the sad-iron may by manipulating it at the handle be turned on the axis of the plunger-section $C^4$ of the beam C, which is rotatably confined in the section $C^3$, and also on the axis $e^2$, besides being movable with the section $C^2$.

The presser-beam section C′, which is shown of T shape in cross-section, terminates at its rear end in a face $i$, containing at each side of the plane of the upright web of the section a vertical slot $i'$. Screw-bolts $i^2$ pass through these slots into and support adjustably a head E, composed of a cylindrical open-ended box $k$, closed at its upper end by a screw-plug $k'$, releasably held against turning by a set-screw $k^9$, and at its lower end by a thimble $k^2$, entering it telescopically and confining therein against the screw-plug a stiff spiral spring $k^3$, the outward movement of the thimble being limited by engagement with a longitudinal slot $k^4$ therein, Fig. 5, of a guide-pin $k^5$, screwed into it through the rear wall of the box, the front wall of which has projecting from its upper end a bearing-lip $k^6$ for a vertical adjusting-screw $k^7$, working in a threaded opening extending downward through a boss $k^8$ on the face $i$. An antifriction-roller $l$ is journaled in bearings depending from the base of the thimble $k^2$ to engage a cam F, with reference to which the roller may upon loosening the bolts $i^2$ be adjusted to regulate the degree of yielding pressure stress exerted at the forward end of the beam C by turning the screw $k^7$ in one direction to lower the head E and in the opposite direction to raise it.

The cam F, which is preferably double, as shown, is carried in position to engage the roll $l$ on the driven shaft G, journaled in suitable bearings to extend across the machine-bed, beyond one side of which it carries a worm-wheel H, engaged by a worm I′ on the drive-shaft I, which is journaled in bearings on the said side of the bed A to extend along the same and carries on the end that projects beyond the rear end of the bed a tight pulley $m$ and a loose pulley $m'$.

The roller $l$ is resiliently held in contact with the surface of the cam F by a spring $n$ of adequate stiffness confined against the bottom of the bed on a rod $n'$, suspended from a hook $n^2$, depending from the beam C.

A shifting-rod K is supported in bearings depending from a side of the bed to be reciprocated longitudinally and has confined endwise about it, near one end, a coiled spring K', which is compressed by retracting the rod from its normal advanced position and tends by its recoil to advance it. The rod carries on its advance end a belt-shifter L, shown as a ring $o$, with a loop $o'$ projecting from its face across the belt-pulleys, through which loop the driving-belt (not shown) passes, so that when the rod is retracted it effects shifting of the belt upon the tight pulley $m$ and in advancing it shifts the belt upon the loose pulley. The pulley $m$ carries on its face, adjacent to the bed, a friction-ring $p$, and fulcrumed at its angle on the bed is a bell-crank $p'$, with one arm carrying a brake-shoe $p^2$ to engage the surface of the ring and the other arm projecting into the path of a finger $p^3$, on and parallel with the rod K, whereby in the advance of the rod the finger engages the bell-crank to turn it on its fulcrum and press the brake-shoe against the ring $p$ to arrest it against rotating under momentum whenever the driving-belt is shifted upon the loose pulley.

A rock-shaft M is journaled in bearings in the lower ends of arms $q$, depending from opposite sides of the bed A, and has firmly secured upon it near one (the right) side of the machine a lever M', forming a treadle. An arm $K^2$ is secured at its lower end to one end of the rock-shaft and at its upper end to the rod K. About midway of the length of the shifting rod there extends horizontally and inwardly therefrom a bracket $r$, having connected with its inner end a lever $r'$, fulcrumed at $x'$ and carrying at its upper end a laterally-projecting stud $r^2$, and $r^3$ is a horizontal trip-lever fulcrumed between its ends at $x^2$, with its forward end beveled, as shown at $r^4$, and a notch $r^5$ adjacent thereto and with a finger $r^6$ projecting from its opposite end into the path of stop-pins $r^7$ $r^7$ at diametrically opposite points on one side of a collar $r^8$, secured on the driven shaft G to rotate with it. A spring $r^9$ on a vertical guide-rod $r^{10}$ is confined against the trip-lever $r^3$ to tend to maintain the latter in its normal horizontal position.

A foot-treadle $s$ is loosely journaled between its ends on the rock-shaft M to extend thence forward and is in position to be actuated by the left foot of the operator, and it carries pivotally on its inner end a rod $s'$, passing vertically through a guide-bracket $s^2$ on the standard $c$ to register with and engage the under side of the solid section C' of the presser-beam for the purpose hereinafter explained.

Parts of the mechanism, as the worm-wheel and the trip mechanism, are preferably incased, as shown.

The operation is as follows: To actuate the machine from the shaft I with the parts in their normal positions, the operator, with the cloth, garment, or other article (not shown) to be acted on laid on the table $b$, and the portion thereof to be pressed spread upon the buck B, depresses with his foot the treadle M', thereby rocking the shaft M, with attendant retraction of the rod K, by the action of the arm $K^2$, turning the lever $r'$ on its fulcrum to ride the stud $r^2$ up the inclined end $r^4$ of the trip-lever $r^3$ into the notch $r^5$, releasing the brake by the turning of the bell-crank $p'$ accordingly and shifting the belt upon the tight pulley $m$. Thereupon the shaft I rotates to cause the worm I' and worm-wheel H to drive the shaft G, and with it the cam F, in the direction indicated by an arrow. As represented in Fig. 4, the rotation of the cam has just begun, while Fig. 5 represents it as nearing the end of the action of one of the two cam-faces. This action consists, by the engagement of the cam with the roller $l$, in raising the rear end of the presser-beam C with an even resilient pressure, due to the cushioning-spring $k^3$ in the head E, and depressing the opposite end of the beam to apply yieldingly to the work the sad-iron D, which the operator has meantime brought into position for the purpose by swinging the beam-section $C^2$ around in front of him, pulling out or forcing inward, if required, the plunger $C^4$ and suitably manipulating the iron by its handle to apply it properly. If while the iron is thus under the effect of the cam pressed against the work the machine should stop or for any other reason it should be desirable, as in case of danger of scorching the work, to raise the sad-iron before the cam clears the roller $l$, the operator may quickly effect this object by turning the hand-wheel $g'$ to raise the screw $g$, thereby permitting the recoil of the springs $f'$ to raise the beam-section $C^3$ on its pivot $e'$, and with it the plunger and sad-iron. When the cam in its rotation brings a depressed surface therein under the roller $l$ to admit the latter, the beam C rises at its forward end, thus raising the sad-iron off the work, and if the treadle M' is meantime released from the pressure of the operator's foot as the roller runs into the cam depression $a$ stud $r^7$ on the collar $r^8$ of the shaft G encounters the lip $r^6$ on the rear end of the trip-lever $r^3$, thereby depressing its forward end to release the lever $r'$ from the notch $r^5$. When the stud $r^2$ is in the notch $r^5$, the rod K is locked in its retracted condition of compressing the spring K', and the described release of the lever $r'$ frees the rod K and permits the recoil of its spring to shoot it forward to turn the lever $r'$ accordingly, shift the belt to the loose pulley $m'$, and cause the finger $p^3$ to turn the bell-crank $p'$ and actuate the brake.

When it is desired to dispense with the action of the power-driven shaft I and perform the pressing work by rocking the beam C, as it may be occasionally for certain classes of work, this may be done by the operator depressing the treadle $s$ to raise the rod $s'$ against the beam C to turn it on its fulcrum $x$.

If it be desired to continue the rotation of the cam without interruption through one or more complete revolutions to cause the beam to oscillate repeatedly for repeating the pressure accordingly of the sad-iron upon the work, the operator may effect this by keeping his foot on the treadle M' to hold it down, thereby retaining the shifting-rod K in its retracted position, the studs $r^7$ as they successively encounter the lever-finger $r^6$ tripping the lever $r^3$, but without freeing it from the arm $r'$.

The preferred construction of the buck B is most clearly illustrated in Figs. 12 to 16, inclusive, and that of the sad-iron D in Figs. 17 to 21, inclusive. The buck, as shown, is an oblong rectangular hollow casting formed with a flat pressing-top 1, vertical sides, each composed of an outer wall 2 and an inner wall 3, forming between them a gas-chamber 4, which extends throughout the length of the buck and is open at its opposite ends, as is also the intermediate space forming the chamber 5 between the sides 3, into which the heating-gas is fed, the base 6 of the central chamber having openings 7 in it for reducing the weight of the device, and a longitudinal series of openings 8 is provided in the top of each wall 3 through which to admit the flame from the burner into the chambers 4 from the central chamber 5. The buck is gas-heated (though it may be otherwise heated) through the medium of a perforated gas-pipe 9, extending into the chamber 5 lengthwise and centrally thereof, being supported at each end in a bracket 10, having in its legs vertical slots 11 11, through which it is adjustably fastened by screw-bolts 12 12 to the ends of the partitions 3, the adjustment enabling the gas discharge from the tube 9 to be effected at different elevations in the chamber 5 in accordance with different gas-pressures from various gas supplies. The spent products of combustion escape from the open ends of the chambers in the buck, whereby they discharge beyond the work to avoid burning the latter, a deflector 13 being provided at one end or, as shown, at each end of the buck, as an additional shield to the work from the escaping hot products of combustion. On the outer end of the tube 9 is provided a conical mixing-chamber 14, open at its flaring end, in which the injector-tube 15 is supported to be fed with gas from a pipe 16, leading from a suitable gas-supply, (not shown,) this pipe containing an ordinary shut-off valve 17. On one side of the buck are provided at intervals in series screw-clamps 18 for releasably confining the free end of a moistening or dampening cloth $t$, which is stretched over the top of the buck from a roll thereof, for carrying which to be paid off, as required, a shaft $u$ is journaled on the bed of the machine behind the buck and is provided at one end for turning it with a hand-wheel $v$.

Except as to its shape the sad-iron D is, generally speaking, like the buck B in inverted position, and the construction of its body portion need not, therefore, be described herein in detail, particularly as the same specific construction of the iron proper is not the subject of any of the appended claims. To the opposite sides of the iron are secured flat plates 19 19, and on each plate is fastened, near each end thereof, a vertical bracket 20, in which is movably confined a stud 21, extending from a leg 23, having endwise confined about it a spiral spring 24, and the two legs at each side of the iron are connected at their lower ends by a water-pipe 25, closed at one extremity and provided with jet-openings 26 along its inner side. A dampening-cloth $w$ is stretched over the base of the sad-iron upon the spraying-pipes 25 and is fastened at its edges on rows of pointed hooks 27, provided on the outer sides of the pipes. Leaf-springs 28, fastened at their lower ends to the pipes 25 near their longitudinal centers and bearing at their upper ends against the plates 19, tend to spread the legs 23 outward, and thus to maintain taut the cloth $w$. On the handle $h^2$ is secured the casing 29 of a valve device 30, into the casing of which leads from a suitable source (not shown) a water-supply pipe 31, the casing having a piston-valve 32 confined against a seat in it, Fig. 20, under spring-pressure, and on a bearing 33, depending from the casing, is pivotally supported a trigger 34, readily accessible for manipulating it, to the thumb of the operator while he holds the handle $h^2$, the trigger bearing at one end against the projecting end of the valve-stem. From a branched outlet 35 on the valve-casing flexible pipes 36 36 lead, respectively, to and are connected with the open ends of the spraying-pipes 25.

As in the case of the buck, a perforated gas-feeding pipe 37 is supported to extend lengthwise in the central chamber of the flat-iron and is provided on its outer end with a conical mixing-chamber 39, to which the gas-supply is fed under control through a valved pipe 40, having a flexible tube 41 connected with it and connecting it with a suitable gas-supply. (Not shown.)

In operating the machine in the manner described with the buck and the sad-iron both heated each depression of the forward end of the beam bears the sad-iron down upon the work to exert its pressing effect upon the latter, the depression of the iron being against the resistance of the springs 24, while the water-pipes 25 bear against the covered surface of the buck, and in the downward movement of the sad-iron the operator trips the trigger 34 to open the valve and admit through the connections therewith of the pipes 25 water into the latter, from which it is sprayed upon the cloth w to moisten it, and thus dampen the surface of the work preparatory to pressing it. With both the upper and lower surfaces between which the work is thus pressed heated the pressing is rendered uniform on both its surfaces, since both are subjected to the same conditions.

By means of my improved machine are attained uniformity in the required elastic pressure exerted upon the work, speed, regularity in the duration of pressure, with even temperature applied to both sides of the cloth under each pressure, thereby producing uniformity in shrinkage and evenness of work.

While the particular construction of the machine and combinations of parts forming it as illustrated and described are the best now known to me, they may be variously modified by those skilled in the art without departure from my invention, which is not, therefore, to be understood to be limited to such exact details and combinations, except in such of the appended claims as particularly specify them.

What I claim as new, and desire to secure by Letters Patent, is—

1. In a cloth-pressing machine of the character described, the combination with a bed, of a presser-beam fulcrumed thereon to be rocked vertically and carrying a sad-iron equipped with means for heating it, water-spraying mechanism connected with said iron, and operative to direct the spraying water underneath the pressing-surface of the iron preparatory to depressing it against the work, a driving-shaft, and means for rocking said beam geared to said shaft to be actuated thereby, for the purpose set forth.

2. In a cloth-pressing machine of the character described, the combination with a bed, of a presser-beam fulcrumed thereon to be rocked vertically and carrying a sad-iron, spring-pressed legs on said iron and water-spraying mechanism connected therewith, a driving-shaft, and means for rocking said beam geared to said shaft to be actuated thereby, for the purpose set forth.

3. In a cloth-pressing machine of the character described, the combination with a bed, of a presser-beam fulcrumed thereon to be rocked vertically, a sad-iron pivotally connected with said beam and equipped with heating means, a dampening-cloth covering the face of said iron, valve-controlled water-spraying mechanism connected with said iron for dampening said cloth, a buck supported on the bed to coöperate with said iron and provided on one side with a roller for a roll of dampening-cloth to be stretched over its face and at its opposite side with clamps for releasably fastening said cloth from said roll, a driving-shaft, and means for rocking said beam geared to said shaft to be actuated thereby, for the purpose set forth.

4. In a cloth-pressing machine of the character described, the combination with a bed, of a presser-beam fulcrumed thereon to be rocked vertically, a sad-iron pivotally connected with said beam and equipped with means for heating it, a valve device on said iron adapted to be connected with a water-supply and having water-conducting tubes leading from it, a trigger for operating the valve, legs on said iron and perforated water-pipes on said legs connected with said tubes, a driving-shaft, and means for rocking said beam geared to said shaft to be actuated thereby, for the purpose set forth.

5. In a cloth-pressing machine of the character described, the combination with a bed, of a presser-beam formed of a rear section at which it is fulcrumed to be rocked vertically, a section pivotally connected with said rear section to be swung laterally thereon, a section within and pivotally connected at its rear end with said swinging section to yield vertically, with a spring-support sustaining it in advance of the pivot, a set-screw device supported to bear against said spring-sustained section in opposition to its spring-support, a plunger in said last-named section longitudinally and rotatably movable therein, a sad-iron pivotally connected with the forward end of said plunger, a driving-shaft, and means for rocking said beam geared to said shaft to be actuated thereby, for the purpose set forth.

6. In a cloth-pressing machine of the character described, the combination with a bed, of a presser-beam fulcrumed thereon between its ends to be rocked vertically and carrying a sad-iron pivotally on its forward end and provided on its rear end with a spring-head, a driving-shaft and a driven shaft geared together, and a cam on said driven shaft engaging said head, for the purpose set forth.

7. In a cloth-pressing machine of the character described, the combination with a bed, of a presser-beam fulcrumed thereon between its ends to be rocked vertically and formed of flexibly-connected sections, with a sad-iron pivotally suspended from its forward end and a vertically-adjustable spring-head on its rear end, a driving-shaft and a driven shaft geared together, and a cam on said driven shaft engaging said head, for the purpose set forth.

8. In a cloth-pressing machine of the character described, the combination with a bed, of a presser-beam fulcrumed thereon between its ends to be rocked vertically and formed of flexibly-connected sections, with a sad-iron pivotally suspended from its forward end and a spring-head on its rear end, a driving-shaft and a driven shaft geared together, and a double cam on said driven shaft engaging said head, for the purpose set forth.

9. In a cloth-pressing machine of the character described, the combination with a bed, of a presser-beam fulcrumed thereon between its ends to be rocked vertically and formed of flexibly-connected sections, with a sad-iron pivotally suspended on its forward end and a spring-head on its rear end equipped with a bearing-roller, a driving-shaft and a driven shaft geared together, a double cam on said driven shaft engaging said roller, and a spring-pressed rod connected with the rear section of the beam to hold the roller resiliently against the cam, for the purpose set forth.

10. In a cloth-pressing machine of the character described, the combination with a bed, of a presser-beam fulcrumed thereon between its ends to be rocked vertically and formed of flexibly-connected sections, with a sad-iron pivotally suspended on its forward end and a spring-head on its rear end equipped with a bearing-roller, a driving worm-shaft provided with means for connecting it with the driving power, a driven shaft carrying a worm-wheel engaging the worm and a cam engaging said roller, a treadle device, and starting and stopping means for the drive-shaft operatively connected with said treadle device, for the purpose set forth.

11. In a cloth-pressing machine of the character described, the combination with a bed, of a presser-beam fulcrumed thereon between its ends to be rocked vertically and formed of flexibly-connected sections, with a sad-iron pivotally suspended on its forward end and a spring-head on its rear end equipped with a bearing-roller, a driving worm-shaft carrying tight and loose pulleys, a driven shaft carrying a worm-wheel engaging the worm and a cam engaging said roller, a reciprocating spring-pressed rod carrying at one end a belt-shifter, a treadle device connected with said rod for retracting it, and means for releasably arresting the cam operatively connected with said rod, for the purpose set forth.

12. In a cloth-pressing machine of the character described, the combination with a bed, of a presser-beam fulcrumed thereon between its ends to be rocked vertically and formed of flexibly-connected sections with a sad-iron pivotally suspended on its forward end and a spring-head on its rear end equipped with a bearing-roller, a driving worm-shaft carrying tight and loose pulleys and a brake-ring, a driven shaft carrying a worm-wheel engaging the worm and a cam engaging said roller, a bell-crank fulcrumed on the bed and carrying a brake-shoe to engage said ring, a reciprocating spring-pressed rod carrying a belt-shifter and a finger to engage said bell-crank, and a treadle connected with said rod for retracting it, for the purpose set forth.

13. In a cloth-pressing machine of the character described, the combination with a bed, of a presser-beam fulcrumed thereon between its ends to be rocked vertically and formed of flexibly-connected sections, with a sad-iron pivotally suspended on its forward end and a spring-head on its rear end equipped with a bearing-roller, a driving worm-shaft carrying tight and loose pulleys and a brake-ring, a driven shaft carrying a worm-wheel engaging the worm, a double cam engaging said roller and a collar provided with trip-studs, a bell-crank fulcrumed on the bed and carrying a brake-shoe to engage said ring, a spring-sustained trip-lever extending at one end into the path of said studs, a locking-lever for said trip-lever releasably engaging its opposite end, a reciprocating spring-pressed rod carrying a belt-shifter and a finger to engage said bell-crank and with which said locking-lever is connected at its lower end, and a treadle device connected with said rod for retracting it, for the purpose set forth.

JACOB ECKER.

In presence of—
  J. H. LANDES,
  L. HEISLAR.